United States Patent
Oto et al.

(10) Patent No.: US 10,189,527 B2
(45) Date of Patent: Jan. 29, 2019

(54) FUEL SUPPLY DEVICE OF MOTORCYCLE

(71) Applicant: HONDA MOTOR CO., LTD., Tokyo (JP)

(72) Inventors: Hiroaki Oto, Wako (JP); Yuki Mizukura, Wako (JP); Takeshi Shimura, Wako (JP); Toshifumi Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/071,845

(22) Filed: Mar. 16, 2016

(65) Prior Publication Data

US 2016/0280302 A1 Sep. 29, 2016

(30) Foreign Application Priority Data

Mar. 23, 2015 (JP) .................................. 2015-059117

(51) Int. Cl.
*B62J 37/00* (2006.01)
*F02M 37/00* (2006.01)
(Continued)

(52) U.S. Cl.
CPC .............. *B62J 37/00* (2013.01); *B60K 13/04* (2013.01); *B62J 23/00* (2013.01); *B62J 35/00* (2013.01);
(Continued)

(58) Field of Classification Search
CPC . B62J 37/00; B62J 23/00; B62J 35/00; B60K 13/02; B60K 13/04; B60K 11/00;
(Continued)

(56) References Cited

U.S. PATENT DOCUMENTS 6,357,424 B1 * 3/2002 Sonoda .................... F02B 61/02
123/184.21
7,681,682 B2 * 3/2010 Miyashiro ................ B62J 35/00
180/219

(Continued)

FOREIGN PATENT DOCUMENTS

DE 10007787 A1 8/2000
EP 2159143 A1 3/2010
(Continued)

*Primary Examiner* — Lindsay Low
*Assistant Examiner* — George Jin
(74) *Attorney, Agent, or Firm* — Birch, Stewart, Kolasch & Birch, LLP (57) ABSTRACT

A fuel supply device for a motorcycle having a fuel pump disposed on the outside of a fuel tank for saving with respect to an installation space and for making a fuel pipe connecting the fuel tank and the fuel pump shorter. A fuel supply device for a motorcycle includes a single main frame extending rearwardly from a head pipe; a fuel tank supported on the main frame; an internal combustion engine; a fuel injection device attached to the internal combustion engine; and a fuel supply portion having a fuel pump by which the fuel is supplied to the fuel injection device via a fuel pipe. The fuel pump is provided on the outside of the fuel tank and attached to the main frame in such a manner that an axial line in a direction in which to connect the fuel pipe is aligned along the main frame.

10 Claims, 5 Drawing Sheets (51) Int. Cl.
  *B62M 7/02*      (2006.01)
  *F02M 37/08*     (2006.01)
  *B60K 13/04*     (2006.01)
  *B62J 23/00*     (2006.01)
  *B62J 35/00*     (2006.01)
  *F02M 53/04*     (2006.01)
  *F02B 61/02*     (2006.01)

(52) U.S. Cl.
  CPC ............ *B62M 7/02* (2013.01); *F02M 37/007* (2013.01); *F02M 37/0052* (2013.01); *F02M 37/0076* (2013.01); *F02M 37/08* (2013.01); *F02M 53/046* (2013.01); *F02B 61/02* (2013.01); *F02M 2200/85* (2013.01)

(58) Field of Classification Search
  CPC .. B62M 7/02; B62M 7/04; B62M 7/06; F02B 61/02; F02B 75/20; F02M 37/04; F02M 37/0047; F02M 37/0052; F02M 37/007; F02M 37/0076; F02M 37/106; F02M 37/08; F02M 37/103; F02M 53/046
  See application file for complete search history.

(56) References Cited

U.S. PATENT DOCUMENTS

| | | | | |
|---|---|---|---|---|
| 2003/0079926 | A1* | 5/2003 | Taniguchi | B62K 11/04 180/219 |
| 2005/0150706 | A1* | 7/2005 | Eguchi | F02M 37/007 180/291 |
| 2007/0125585 | A1* | 6/2007 | Takahashi | B62J 37/00 180/219 |
| 2008/0210203 | A1* | 9/2008 | Sugiyama | B62J 37/00 123/509 |
| 2009/0065280 | A1* | 3/2009 | Kakuta | B62M 7/02 180/296 |
| 2011/0073079 | A1 | 3/2011 | Ishii et al. | |
| 2013/0153319 | A1* | 6/2013 | Kawano | B60K 15/03006 180/69.4 |

FOREIGN PATENT DOCUMENTS

| | | | | |
|---|---|---|---|---|
| JP | 2010006280 A | * | 1/2010 | B62J 31/00 |
| JP | 2011-73479 A | | 4/2011 | |

* cited by examiner

FUEL SUPPLY DEVICE OF MOTORCYCLE

CROSS-REFERENCE TO RELATED APPLICATIONS

The present application claims priority under 35 USC 119 to Japanese Patent Application No. 2015-059117 filed Mar. 23, 2015 the entire contents of which are hereby incorporated by reference.

BACKGROUND OF THE INVENTION

1. Field of the Invention

The present invention relates to a fuel supply device for a motorcycle.

2. Description of Background Art

A fuel supply device for a motorcycle is known. See, for example, JPA-2011-73479. This fuel supply device includes a fuel pump (51) disposed on the outside of a fuel tank (50). With the aim of saving an installation space of the fuel pump (51), the fuel pump (51) is disposed in front of a rear shock absorber (23) and behind an output shaft (35) of a power unit (30). See, paragraphs [0032] and [0033] of JP-A-2011-73479.

The fuel supply device for a motorcycle, as described above, has the fuel pump (51) disposed behind the output shaft (35) of the power unit (30). According to this configuration, a fuel pipe connecting the fuel tank (50) supported on a main frame (4) and the fuel pump (51) becomes longer. At the same time, a piping configuration becomes complex in consideration with respect to the balance relative to other in-vehicle components.

SUMMARY AND OBJECTS OF THE INVENTION

An object of an embodiment of the present invention is to provide a fuel supply device for a motorcycle having a fuel pump disposed on the outside of a fuel tank, which is not only capable of saving an installation space of the fuel pump but also making a fuel pipe connecting the fuel tank and the fuel pump shorter.

According to an embodiment of the present invention, a fuel supply device for a motorcycle includes a single main frame extending rearwardly from a head pipe; a fuel tank supported on the main frame; an internal combustion engine run on fuel from the fuel tank; a fuel injection device attached to the internal combustion engine; and a fuel supply portion having a fuel pump by which the fuel in the fuel tank is supplied to the fuel injection device via a fuel pipe. The fuel pump is provided on an outside of the fuel tank and attached to the main frame in such a manner that an axial line in a direction in which to connect the fuel pipe is aligned along the main frame.

According to an embodiment of the present invention, the fuel pump is also attached to the main frame on which the fuel tank is supported. Thus, not only the fuel pipe connecting the fuel tank and the fuel pump can be shorter, but also the fuel pump and a rear shock absorber hardly interfere with each other. Also, the fuel pump is attached to the main frame in such a manner that the axial line in a direction in which to connect the fuel pipe is aligned along the main frame. Thus, a fuel inlet port to the fuel pump can face toward the fuel tank. Consequently, not only can the routing of the fuel pipe be easier, but also an installation space of the fuel pump can be saved.

According to an embodiment of the present invention, in the fuel supply device for a motorcycle having the fuel pump disposed on the outside of the fuel tank, not only can an installation space of the fuel pump be saved, but also the fuel pipe connecting the fuel tank and the fuel pump can be shorter. Consequently, the fuel pump and the rear shock absorber hardly interfere with each other.

According to an embodiment of the present invention, the fuel supply device for a motorcycle may be configured in such a manner that the fuel pump is disposed so as to be overlapped on the main frame when viewed sideways of a vehicle.

According to an embodiment of the present invention, it becomes easier to avoid interference of the fuel pump with members provided above and below the main frame. At the same time, the fuel pump can be prevented from protruding from the main frame in a height direction or an amount of protrusion can be suppressed. Thus, space can be further saved by reducing a dead space.

According to an embodiment of the present invention, the fuel supply device for a motorcycle may be configured in such a manner that the fuel pump is disposed inside the fuel tank in a vehicle width direction.

According to an embodiment of the present invention, the rider's legs hardly interfere with the fuel pump while the rider grips the fuel tank between his/her knees. The rider is thus able to ride on the motorcycle comfortably.

In a case where the fuel tank has a shroud that the rider can grip between his knees, the fuel tank referred to herein includes a fuel tank with the shroud (an assembly of the fuel tank and the shroud).

According to an embodiment of the present invention, when the fuel tank has the shroud that the rider can grip between his/her knees, the fuel supply device for a motorcycle is configured in such a manner that the fuel pump is disposed inside "the assembly of the fuel tank and the shroud" in the vehicle width direction.

According to an embodiment of the present invention, the fuel supply device for a motorcycle may be configured in such a manner that a protection member protruding outwardly in the vehicle width direction more than the fuel pump is provided to the main frame in a space between the fuel pump and the fuel tank.

According to an embodiment of the present invention, the fuel pump can be protected using a clearance developed between the fuel pump and the fuel tank.

According to an embodiment of the present invention, the fuel supply device for a motorcycle may be configured in such a manner that an exhaust pipe of the internal combustion engine is provided on an opposite side to the fuel supply portion in the vehicle width direction.

According to an embodiment of the present invention, the routing of the fuel pipe can be easier by disposing the fuel supply portion as a whole on one side of the vehicle. At the same time, by disposing the exhaust pipe on the opposite side to the fuel supply portion, the heat effect from the exhaust pipe to the fuel supply portion can be suppressed. Thus, vaporization and separation of fuel due to heat effect can be suppressed.

According to an embodiment of the present invention, the fuel supply device for a motorcycle may be configured in such a manner that the fuel supply portion includes a fuel cock having a reserve position, and each of the fuel cock, the fuel pump, and the fuel pipe is provided on an opposite side to the exhaust pipe in the vehicle width direction.

When configured in this manner, the fuel pipe can be shorter because the fuel cock, the fuel pump, and the fuel pipe are all disposed on the same side. Also, because the fuel cock is positioned on the opposite side to the exhaust pipe, when the rider operates the fuel cock, the rider can make an operation without influences of the exhaust pipe that can be hot.

According to an embodiment of the present invention, the fuel supply device for a motorcycle may be configured in such a manner that an ignition coil for a spark plug of the internal combustion engine is provided on an opposite side to the fuel supply portion in the vehicle width direction.

According to an embodiment of the present invention, although the ignition coil is electrically charged with a high voltage, electrical interference between the ignition coil and the fuel supply portion can be suppressed.

According to an embodiment of the present invention, the fuel supply device for a motorcycle may be configured in such a manner that an exhaust pipe of the internal combustion engine is provided on an opposite side to the fuel supply portion in the vehicle width direction whereas an ignition coil for a sparking plug of the internal combustion engine is provided on a same side as the exhaust pipe. In addition, a heat shield plate is provided between the ignition coil and the exhaust pipe.

According to an embodiment of the present invention, electrical interference to the fuel supply portion can be suppressed, and the heat shield plate suppresses heat effect from the exhaust pipe to the ignition coil that requires delicate control. Consequently, durability of the ignition coil can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of a fuel supply device for a motorcycle according to the invention will be described with reference to the drawings. Drawings are viewed in a direction indicated by reference numerals and signs. In the following description, a front-rear direction, a right-left direction, and a top-bottom direction are directions when viewed from a driver. When it is necessary, a front end of a vehicle is indicated by Fr in the drawings. Likewise, a rear end is indicated by Rr, a left side is indicated by L, a right side is indicated by R, an upper side is indicated by U, and a lower side is indicated by D. In the respective drawings, same or equivalent portions are labeled with same reference numerals and signs.

Figure 1:
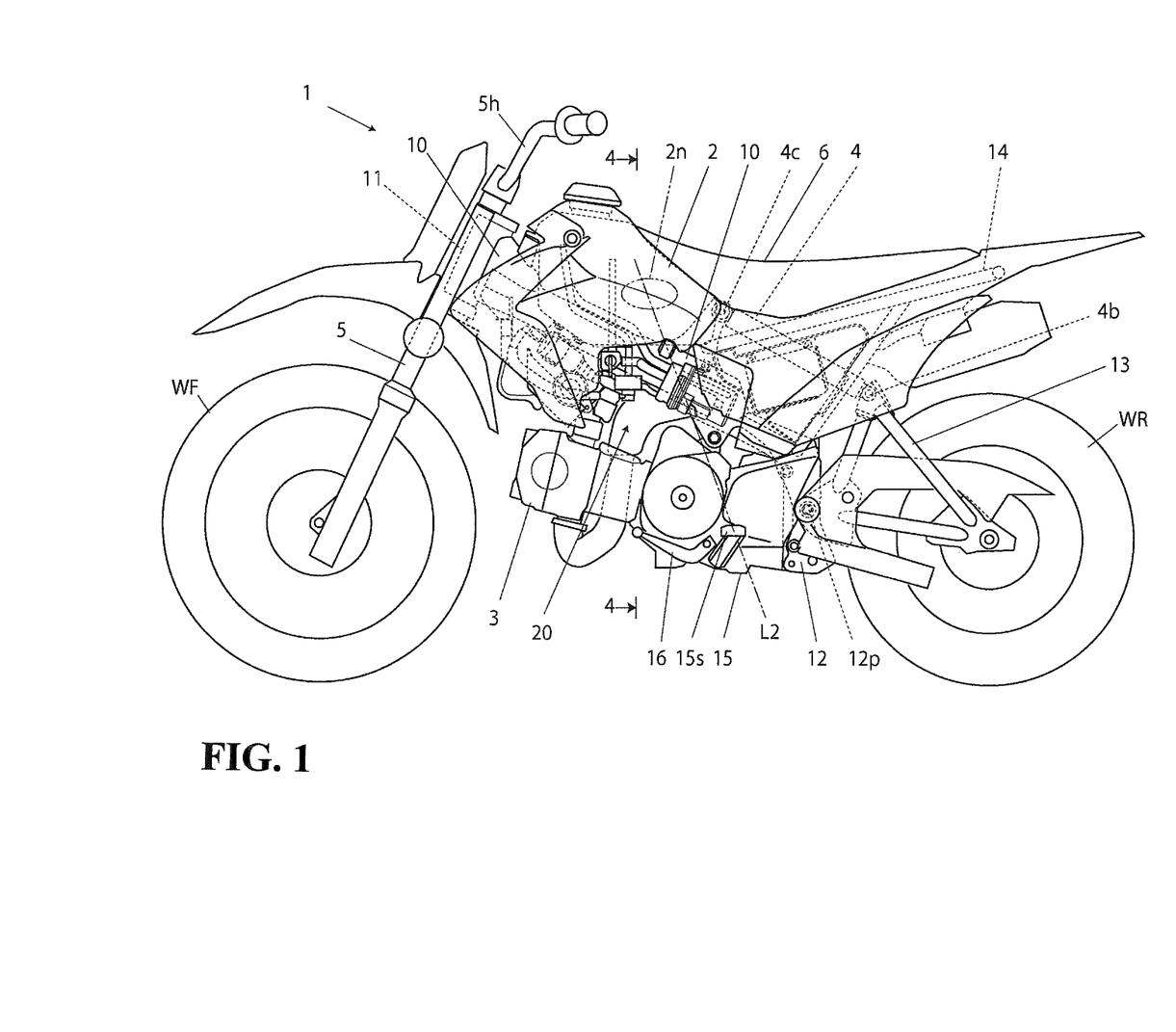
FIG. 1 is a left side view showing an example for a motorcycle employing an embodiment of a fuel supply device for a motorcycle of the invention.
Figure 3:
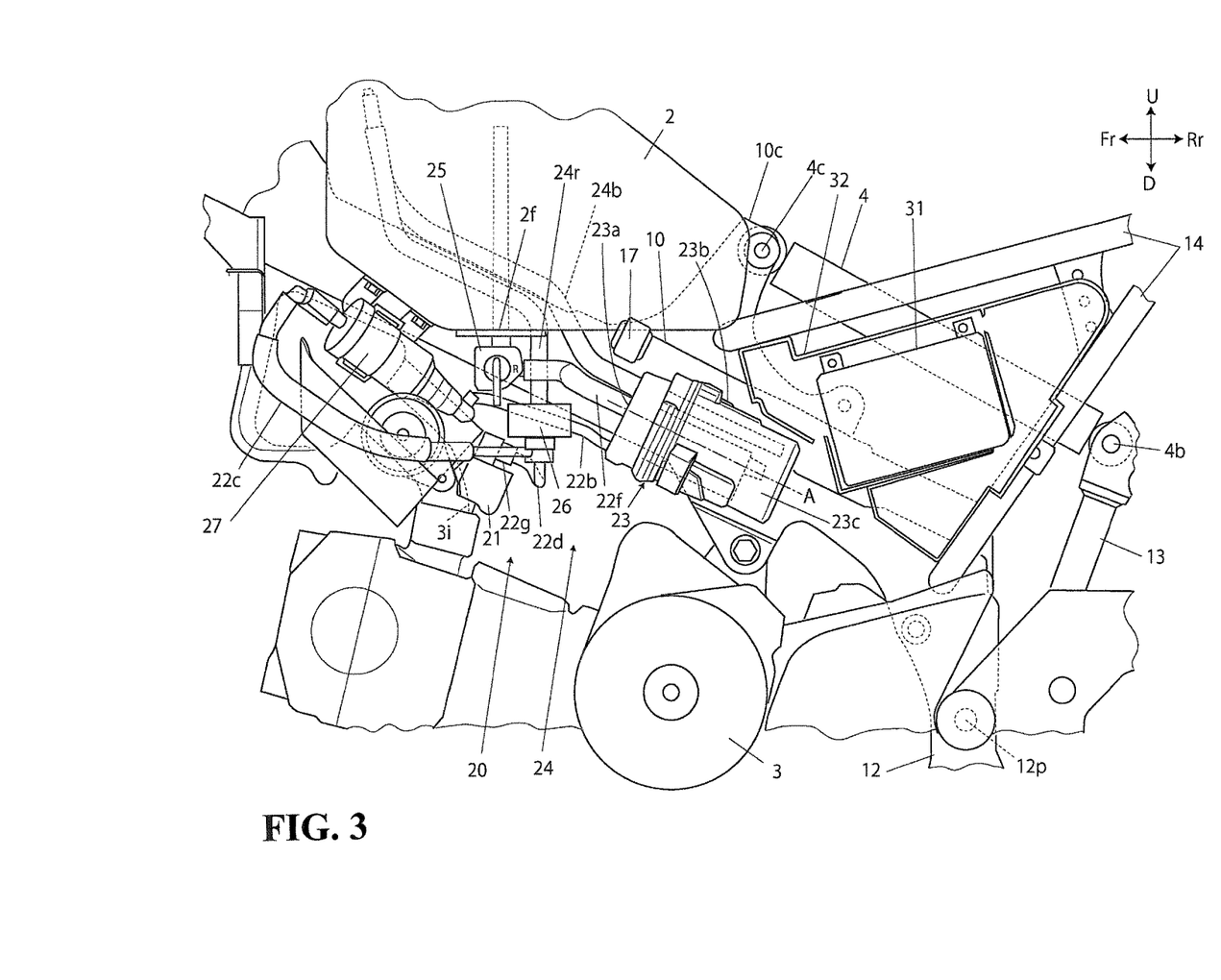
FIG. 3 is a partially enlarged view of FIG. 1.

As are shown in FIGS. 1 and 3, a fuel supply device 20 for a motorcycle 1 includes a single main frame 10 (see FIG. 5) extending rearwardly from a head pipe 11 with a fuel tank 2 supported on the main frame 10. An internal combustion engine 3 is operatively connected to a fuel injection device 21 attached to the internal combustion engine 3 with a fuel supply portion 24 having a fuel pump 23 by which fuel in the fuel tank 2 is supplied to the fuel injection device 21 via a fuel pipe 22f.

The fuel pump 23 is provided on the outside of the fuel tank 2 and attached to the main frame 10 in such a manner that an axial line A in a direction in which to connect the fuel pipe 22f is aligned along the main frame 10.

According to the fuel supply device 20 of the motorcycle 1, the fuel pump 23 is also attached to the main frame 10 on which the fuel tank 2 is supported. This configuration can make the fuel pipe 22f connecting the fuel tank 2 and the fuel pump 23 shorter. Also, the fuel pump 23 is attached to the main frame 10 in such a manner that the axial line A in a direction in which to connect the fuel pipe 22f is aligned along the main frame 10. This configuration can have a fuel inlet port 23a to the fuel pump 23 face toward the fuel tank 2. Thus, not only can the routing of the fuel pipe 22f be easier, but also an installation space of the fuel pump 23 can be saved.

As has been described, according to the fuel supply device 20 of the motorcycle 1 having the fuel pump 23 disposed on the outside of the fuel tank 2, not only can an installation space of the fuel pump 23 be saved, but also the fuel pipe 22f connecting the fuel tank 2 and the fuel pump 23 can be shorter.

A fuel discharge port 2f of the fuel tank 2 to the fuel pipe 22f is provided on the upper side of the fuel inlet port 23a of the fuel pump 23 for the fuel pipe 22f. Also, the fuel pipe 22f is inclined so that the downstream side is always on the lower side. Thus, not only can fuel in the fuel tank 2 be smoothly supplied to the fuel pump 23 by gravity, but also the generation of air bubbles in the pipe 22f can be suppressed.

The fuel pipe 22f is disposed along the main frame 10. The fuel pipe 22f may be supported on the main frame 10 when necessary.

When configured in this manner, the fuel pipe 22f can be readily positioned so that the downstream side is always on the lower side.

A pressure regulator 26 is provided that regulates fuel pumped out from the fuel pump 23 to be at a predetermined pressure.

A fuel filter 27 is provided for filtration of fuel to be supplied to the fuel injection device 21.

A fuel hose 22b connects the fuel pump 23 and the fuel filter 27.

A fuel hose 22c connects the fuel filter 27 and the pressure regulator 26.

A fuel hose 22d connects the pressure regulator 26 and the fuel injection device 21. The fuel hose 22d is provided with a connector 22g to the fuel ejection device 21 at a tip end.

An intake pipe 3i is attached to the fuel injection device 21.

Fuel in the fuel tank 2 is passed from one component to another in the order as follows.

More specifically, fuel in the fuel tank 2 flows to the fuel injection device 21 by way of a fuel cock 25, the fuel pipe 22f, the fuel pump 23, the fuel hose 22b, the fuel filter 27, the fuel hose 22c, the pressure regulator 26, and the fuel hose 22d.

The "fuel supply portion" means a fuel supply system to the fuel injection device 21. The fuel supply portion 24 of this embodiment includes the fuel tank 2, the fuel cock 25, the fuel pipe 22f, the fuel pump 23, the fuel hose 22b, the fuel filter 27, the fuel hose 22c, the pressure regulator 26, and the fuel hose 22d. It should be appreciated, however, that a portion can be the "fuel supply portion" as long as the portion includes a fuel pump by which fuel is supplied to a fuel injection device.

A breather hose 24b is provided to maintain an interior of the fuel pump 23 at atmospheric pressure. The breather hose 24b is connected to the fuel pump 23 at one end and opens in the fuel tank 2 at the other end.

A return hose 24r returns extra fuel to the fuel tank 2 when a pressure of fuel at the pressure regulator 26 reaches or exceeds the predetermined pressure. The return hose 24r is connected to the pressure regulator 26 at one end and opens in the fuel tank 2 at the other end.

As is shown in FIG. 1, a front fork 5 is attached to a head pipe 11 in a steerable manner by a handle 5h. Also, a front wheel WF is supported on a lower end of the front fork 5.

A pair of right and left pivot frames 12 (see FIG. 5) each extending downwardly is provided at the rear end of the main frame 10. A swing arm 13 is supported on each pivot frame 12 with a pivot 12p in a swingable manner. A rear wheel WR is supported on rear ends of the swing arms 13. The rear wheel WR is driven by the internal combustion engine 3.

As shown in FIG. 3, one end 4b of a rear shock absorber 4 is connected in a rotatable manner to the swing arms 13, and the other end 4c is connected in a rotatable manner to a shock absorber reception portion 10c provided to the main frame 10.

Figure 4:
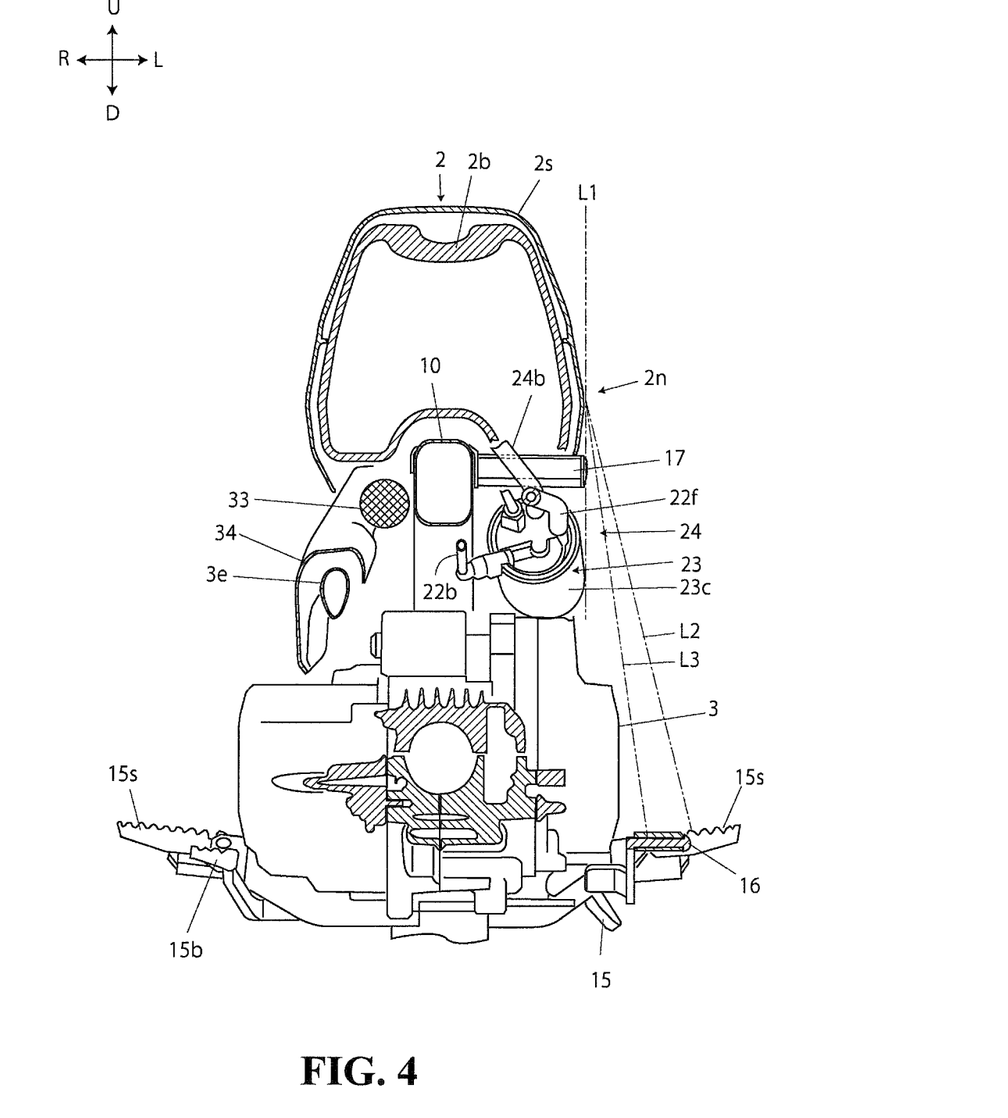
FIG. 4 is a partial sectional view taken along the line 4-4 of FIG. 1.

The fuel tank 2 is attached to the main frame 10 so as to be astride the main frame 10 (see FIG. 4). A seat 6 on which a rider sits is provided in a rear portion of the fuel tank 2. The seat 6 is supported on a rear frame 14 that extends rearwardly from the rear portion of the main frame 10. A bottom frame 15 is provided in front of lower ends of the pivot frames 12. Steps 15s on which a rider puts his/her feet are provided to the bottom frame 15. A change pedal 16 is provided.

As is shown in FIG. 3, the fuel pump 23 is disposed so as to be overlapped on the main frame 10 when viewed from the side of the vehicle.

When configured in this manner, it becomes easier to avoid interference of the fuel pump 23 with members (for example, a storing box 32 to store a battery 31, and the internal combustion engine 3 of FIG. 3) provided above and below the main frame 10. At the same time, the fuel pump 23 can be prevented from protruding from the main frame 10 in a height direction or an amount of protrusion can be suppressed. Thus, space can be saved further by reducing a dead space.

Figure 5:
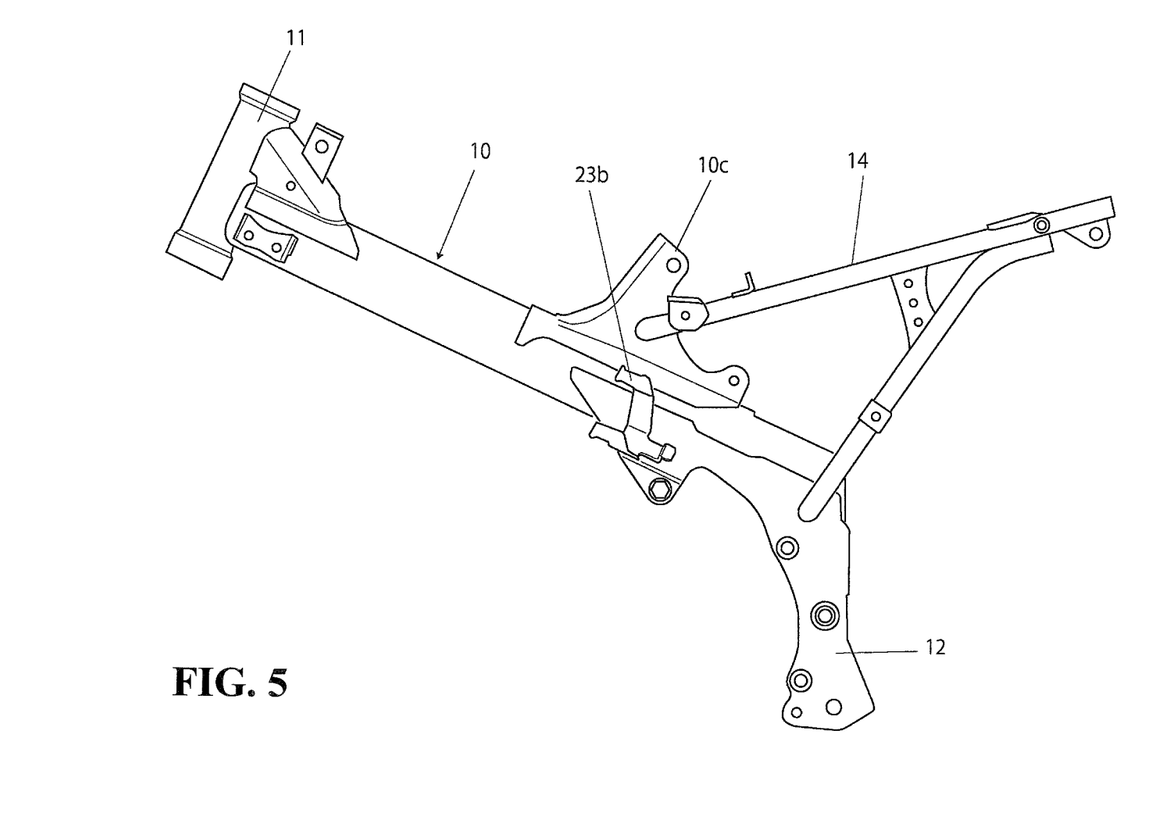
FIG. 5 is a left side view of a main frame.

The fuel pump 23 is attached to the main frame 10 while the fuel pump 23 is inserted into a tube-like member (protection case) 23c which is attached to the main frame 10 using a fuel pump attachment stay 23b (see FIG. 5).

Thus, the fuel pump 23 can be readily attached to the main frame 10 and also can be protected from debris over the whole circumference by the tube-like member 23c.

As is shown in FIG. 4, the fuel pump 23 is disposed inside the fuel tank 2 in a vehicle width direction.

When configured in this manner, the rider's legs hardly interfere with the fuel pump 23 while the rider grips the fuel tank 2 between his legs. The rider is thus able to ride on the motorcycle 1 comfortably.

Thus, in a case where the fuel tank 2 has a shroud 2s that the rider can grip between his/her knees as in this embodiment, the fuel tank 2 referred to herein includes a fuel tank with the shroud 2s (fuel tank (2) in the form of an assembly of a fuel tank main body 2b and the shroud 2s).

More specifically, when the fuel tank 2 has the shroud 2s that the rider can grip between his/her knees, the fuel supply device 20 of the motorcycle 1 is configured in such a manner that the fuel pump 23 is disposed inside "the assembly (2) of the fuel tank main body 2b and the shroud 2s" in the vehicle width direction.

More specifically, L1 is a perpendicular line drawn downwardly from a region 2n which is a region of the fuel tank 2 frequently gripped between the rider's knees. The fuel pump 23 is disposed inside this perpendicular line L1 in the vehicle width direction.

Also, L2 (see FIGS. 1 and 4) is a line linking the region 2n which is a region of the fuel tank 2 frequently gripped between the rider's knees and an intermediate point of the step 15s in the vehicle width direction (position at which the rider usually puts his/her foot) and L3 be a line linking the region 2n and an inner end of the step 15s in the vehicle width direction (inner limit position up to which the rider can put his/her foot). Then, the fuel pump 23 is disposed inside the line L2, and more preferably inside the line L3 in the vehicle width direction.

Figure 2:
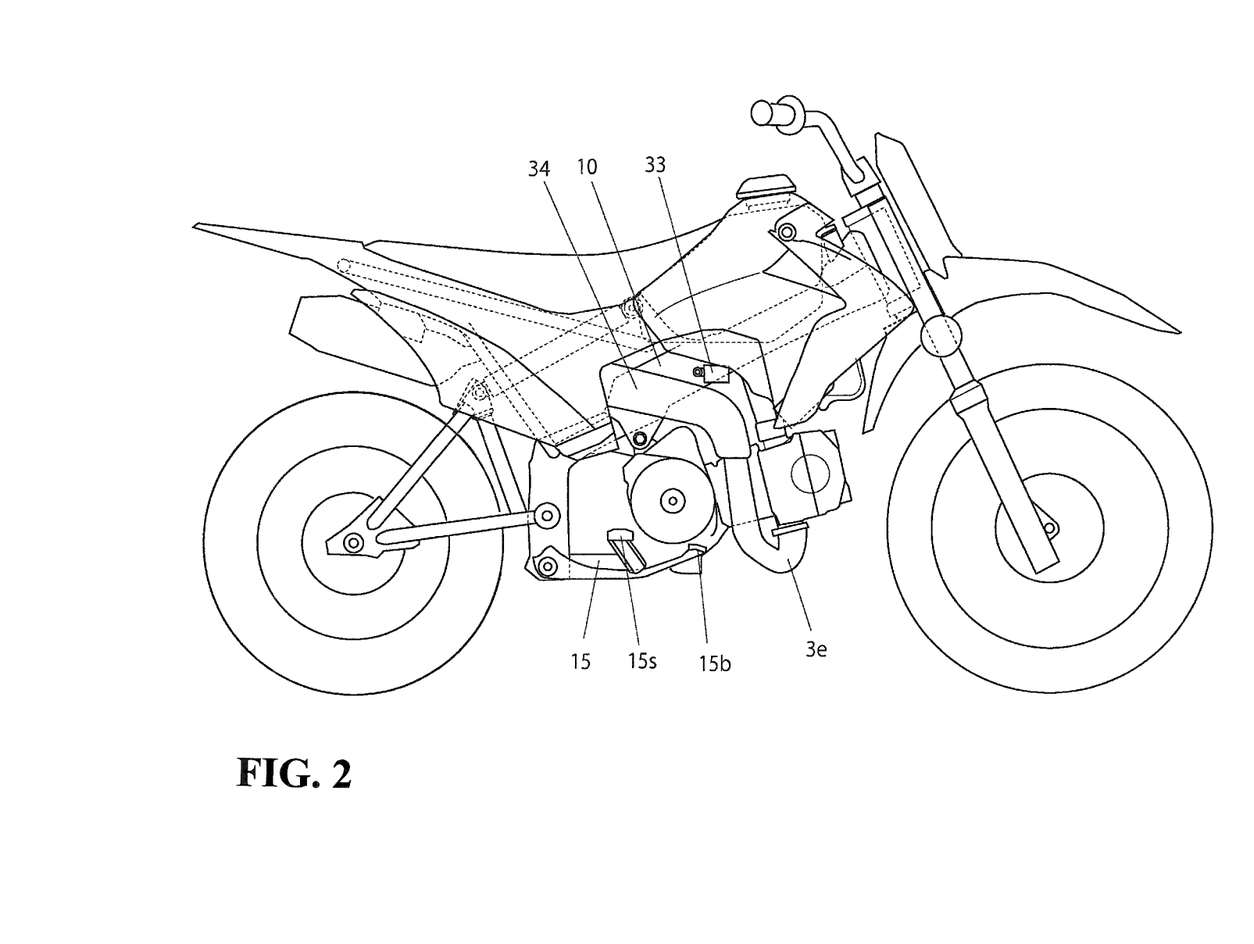
FIG. 2 is a right side view of the motorcycle of FIG. 1.

In FIGS. 2 and 4, a brake pedal 15b is provided.

In FIGS. 3 and 4, a protection member 17 of the fuel pump 23 is provided. The protection member 17 protrudes outwardly in the vehicle width direction more than the fuel pump 23 and is provided to the main frame 10 in a space between the fuel pump 23 and the fuel tank 2.

When configured in this manner, the fuel pump 23 can be protected using a clearance developed between the fuel pump 23 and the fuel tank 2.

The fuel pump 23 is at a position above the internal combustion engine 3 and also inside the internal combustion engine 3 in the vehicle width direction.

When configured in this manner, the fuel pump 23 can be protected by the internal combustion engine 3 from debris or the like hitting from below.

As are shown in FIGS. 2 and 4, an exhaust pipe 3e of the internal combustion engine 3 is provided on the opposite side to the fuel supply portion 24 in the vehicle width direction.

When configured in this manner, the routing of the fuel pipe 22f can be easier by disposing the fuel supply portion 24 as a whole on one side (left side in the drawings) of the vehicle. At the same time, by disposing the exhaust pipe 3e on the opposite side to the fuel supply portion 24, heat effect from the exhaust pipe 3e to the fuel supply portion 24 can be suppressed. Thus, vaporization and separation of fuel due to heat effect can be suppressed.

The fuel supply portion 24 includes the fuel cock 25 having a reserve position R.

Each of the fuel cock 25, the fuel pump 23, and the fuel pipe 22f is provided on the opposite side to the exhaust pipe 3e in the vehicle width direction.

When configured in this manner, the fuel pipe 22f can be shorter because the fuel cock 25, the fuel pump 23, and the fuel pipe 22f are all disposed on the same side. Also, because the fuel cock 25 is positioned on the opposite side to the exhaust pipe 3e, when the rider operates the fuel cock 25, the rider can make an operation without the influences of the exhaust pipe 3e that can be hot.

As shown in FIGS. 2 and 4, an ignition coil 33 for sparking plugs (not shown) of the internal combustion engine 3 is provided on the opposite side to the fuel supply portion 24 in the vehicle width direction.

Although the ignition coil 33 is electrically charged with a high voltage, electrical interference between the ignition coil 33 and the fuel supply portion 24 can be suppressed.

The ignition coil 33 is attached to the main frame 10.

The ignition coil 33 is provided on the same side as the exhaust pipe 3e (on the opposite side to the fuel supply portion 24 in the vehicle width direction) and a heat shield plate 34 is provided between the ignition coil 33 and the exhaust pipe 3e.

When configured in this manner, electrical interference to the fuel supply portion 24 can be suppressed, and the heat shield plate 34 suppresses heat effect from the exhaust pipe 3e to the ignition coil 33 that requires delicate control. Consequently, durability of the ignition coil 33 can be enhanced.

While the above has described the embodiment of the invention, the invention is not limited to the embodiment above and can be implemented in various modifications within the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel supply device for a motorcycle, comprising:
a single main frame extending from a head pipe, said single main frame including a first side and a second side, the main frame having a first section extending rearwardly from the head pipe and a second section extending downwardly from the first section;
a fuel tank supported on the main frame;
a fuel injection device operatively connected to an internal combustion engine;
a fuel supply portion having a fuel pump wherein fuel in the fuel tank is supplied to the fuel injection device via a fuel pipe;
an exhaust pipe operatively connected to an exhaust port of the internal combustion engine, said exhaust pipe being positioned on the first side of the main frame and extending upwardly from the exhaust port to a position above the internal combustion engine;
wherein the fuel pump is provided on an outside of the fuel tank and attached to the second side of the main frame,
wherein an axial line in a direction in which to connect the fuel pipe is aligned along the main frame with the fuel pump being positioned on the first section of the main frame and above the engine; and
an ignition coil for a sparking plug being positioned on the first side of the main frame, said ignition coil being positioned above the engine and the exhaust pipe,
wherein vaporization and separation of fuel due to a heat effect from the exhaust pipe is suppressed by positioning the fuel pump and the fuel pipe on the second side of the main frame displaced relative to the exhaust pipe positioned on the first side of the main frame, and
wherein the fuel pump is disposed so as to be overlapped on the main frame when viewed sideways of a vehicle, with the exhaust pipe being disposed inside the engine in a vehicle width direction, and the exhaust pipe is disposed at an upper side of the engine.

2. The fuel supply device for a motorcycle according to claim 1, wherein the fuel pump is disposed inside the fuel tank in a motorcycle width direction.

3. The fuel supply device for a motorcycle according to claim 1, wherein the fuel pump is disposed inside the fuel tank in a motorcycle width direction.

4. The fuel supply device for a motorcycle according to claim 1, wherein a protection member, protruding outwardly in a motorcycle width direction relative to the fuel pump protruding, is provided to the main frame in a space between the fuel pump and the fuel tank.

5. The fuel supply device for a motorcycle according to claim 2, wherein a protection member, protruding outwardly in a motorcycle width direction relative to the fuel pump protruding, is provided to the main frame in a space between the fuel pump and the fuel tank.

6. The fuel supply device for a motorcycle according to claim 1, wherein:
the fuel supply portion includes a fuel cock having a reserve position; and
each of the fuel cock, the fuel pump, and the fuel pipe is provided on the second side of the main frame opposite to the exhaust pipe in the motorcycle width direction.

7. The fuel supply device for a motorcycle according to claim 1, and further including a heat shield plate is provided between the ignition coil and the exhaust pipe.

8. A fuel supply device for a motorcycle, comprising:
a fuel tank operatively supported on a main frame, said main frame including a first side and a second side, the main frame having a first section extending rearwardly from the head pipe and a second section extending downwardly from the first section;
a fuel injection device operatively connected to an internal combustion engine;
a fuel supply portion having a fuel pump wherein fuel in the fuel tank is supplied to the fuel injection device via a fuel pipe;
an exhaust pipe operatively connected to an exhaust port of the internal combustion engine, said exhaust pipe being positioned on the first side of the main frame and extending upwardly from the exhaust port to a position above the internal combustion engine;
wherein the fuel pump is provided on an outside of the fuel tank and attached to the second side of the main frame wherein an axial line in a direction in which to connect the fuel pipe is aligned along the main frame with the fuel pump being positioned on the first section of the main frame and above the engine; and
an ignition coil for a sparking plug being positioned on the first side of the main frame, said ignition coil being positioned above the engine and the exhaust pipe,
wherein vaporization and separation of fuel due to a heat effect from the exhaust pipe is suppressed by positioning the fuel pump and the fuel pipe on the second side of the main frame displaced relative to the exhaust pipe positioned on the first side of the main frame, and
wherein the fuel pump is disposed so as to be overlapped on the main frame when viewed sideways of a vehicle, with the exhaust pipe being disposed inside the engine in a vehicle width direction, and the exhaust pipe is disposed at an upper side of the engine.

9. The fuel supply device for a motorcycle according to claim 8, wherein the fuel pump is disposed inside the fuel tank in a motorcycle width direction.

10. The fuel supply device for a motorcycle according to claim 8, wherein a protection member, protruding outwardly in a motorcycle width direction relative to the fuel pump protruding, is provided to the main frame in a space between the fuel pump and the fuel tank.

\* \* \* \* \*